W. C. STEVENS.
MACHINE FOR MAKING TIRE CASINGS.
APPLICATION FILED MAY 8, 1919.
1,334,185.
Patented Mar. 16, 1920.
3 SHEETS—SHEET 1.
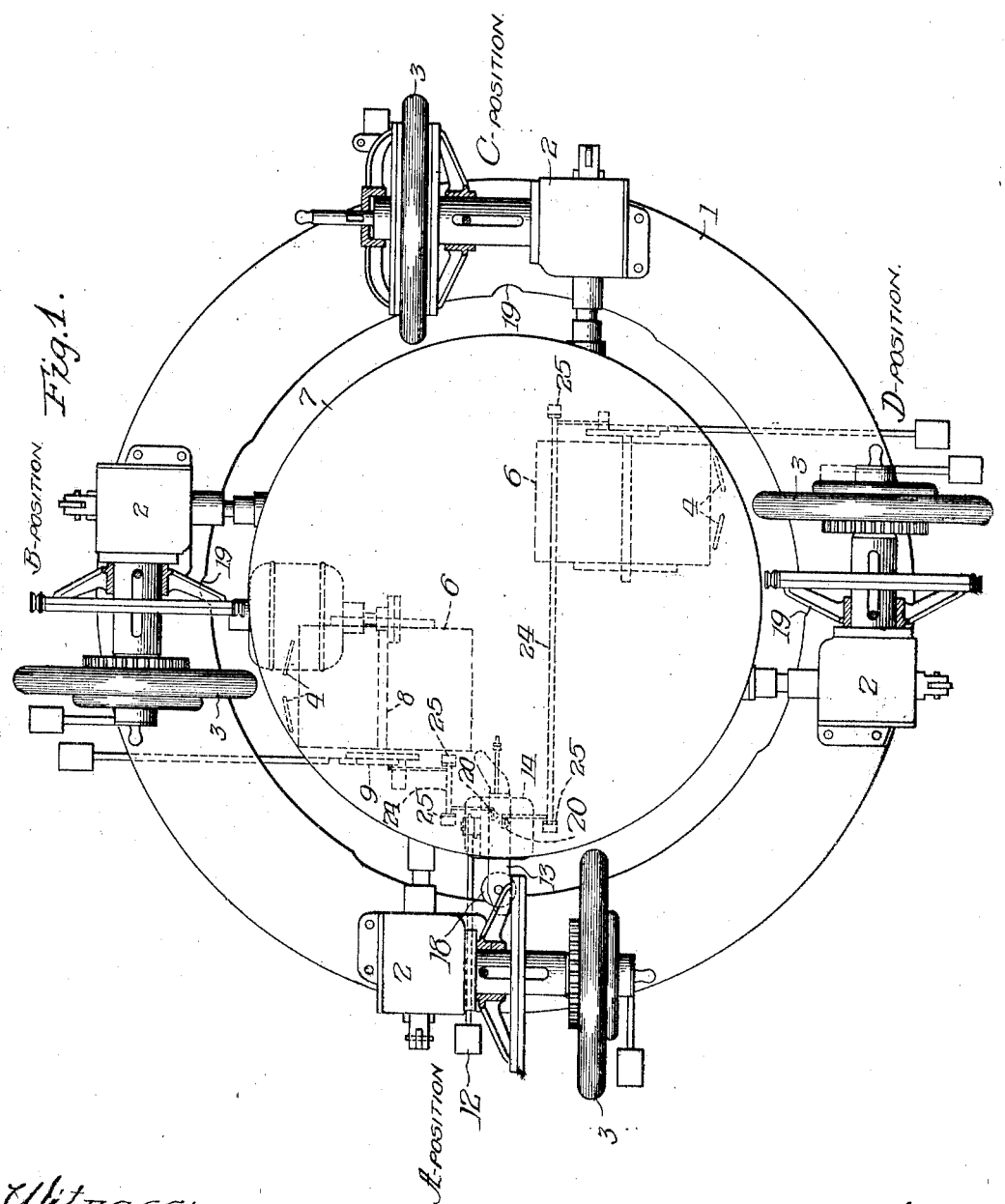

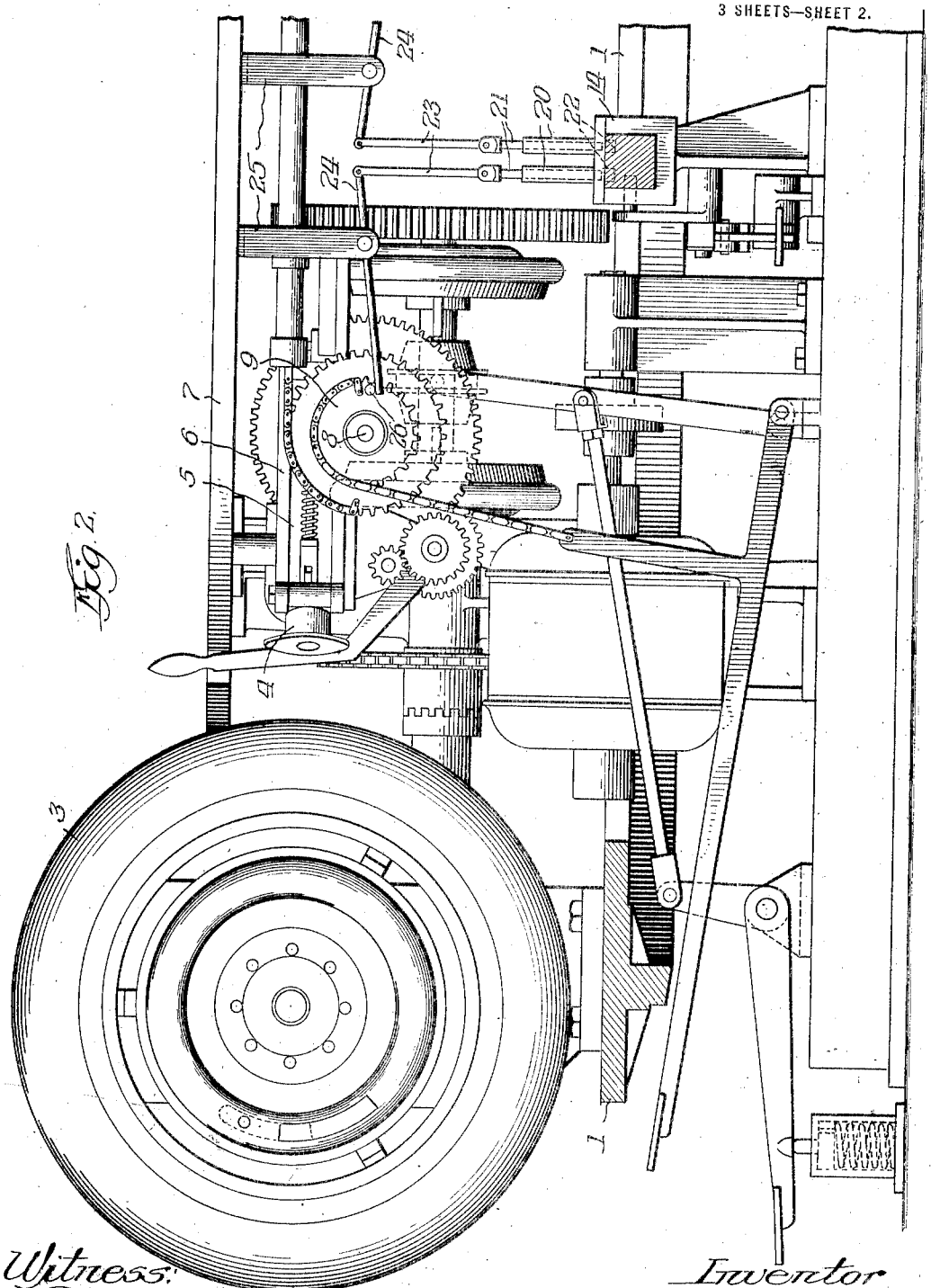

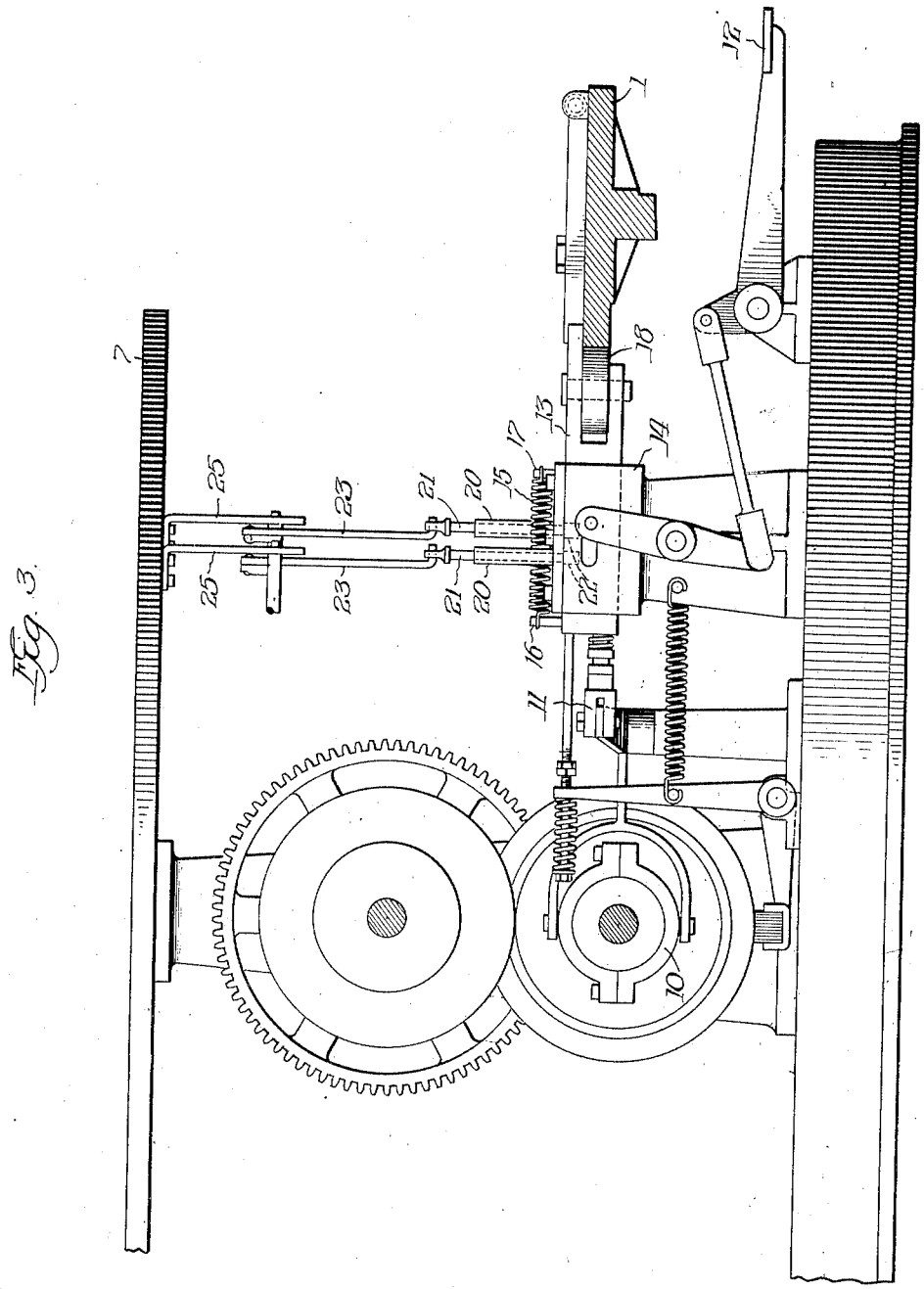

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

MACHINE FOR MAKING TIRE-CASINGS.

1,334,185.  Specification of Letters Patent.  Patented Mar. 16, 1920.

Application filed May 8, 1919. Serial No. 295,675.

*To all whom it may concern:*

Be it known that I, WILLIAM C. STEVENS, a citizen of the United States, residing in Akron, county of Summit, State of Ohio, have invented certain new and useful Improvements in Machines for Making Tire-Casings, of which the following is a specification.

This invention relates to improvements in a machine for making tire carcasses which is characterized by the feature that the tire is built up in a series of steps each of which is performed at a given position, the core and tire thereon being moved past various stations at which the operations are performed.

This invention is specifically an improvement on the machine shown in my prior application, Serial No. 256,429, filed October 1, 1918, to which reference is made for a fuller understanding of the mechanism, it being sufficient to explain at this point that in the said machine there is employed a turntable or revolving carrier on which are located a plurality, preferably four, core supports. As the several operations are finished at the points about the turntable at which the cores are located, it is shifted to move the cores another step. At certain of the stations the fabric is applied to the core and shaped into place. It has been found in the operations of the machine that there is danger of the turntable being started before all of the operations are finished and before the shaping tools are back in their inoperative positions. If the tools are not in their inoperative or retarded positions and the turntable is revolved, there is danger that the core will bend or break the shapers. It is to prevent the occurrence of this accident that my newest improvement relates and there has been devised by me a safety device which will prevent the turntable from moving until the shapers are out of the path of the moving core.

In the drawings herein I have shown one embodiment of my invention, but it is obvious that changes and modifications may be made in the specific form thereof without departing from my invention. In these drawings I have not gone into any details of the construction of the entire machine other than sufficient to enable the operation of the improvement to be understood.

Figure 1 is a plan view of the machine showing the turntable to which reference has been made.

Fig. 2 is a side elevation of one of the stitcher units showing the safety device.

Fig. 3 is a side elevation of the starting mechanism for the turntable.

The machine comprises a shiftable carriage or turntable 1 upon which are carried a plurality of core supports 2, each of which is designed to support and rotate a core through any suitable driving mechanism. There are shown in this embodiment of the invention four of the core supports at A, B, C, and D positions, the first or A position being the one at which the finished tire is trimmed and inspected; the B position where the first plies are applied and stitched into place; the C position where the beads are applied; and the D position where the outer plies are applied and shaped about the core. The shaping mechanism may be of any well-known form, and is here shown as a pair of spinning rollers which are arranged to be advanced over the surface of the core while the latter is rotating rapidly, and withdrawn after completing the shaping operation.

The stitchers are shown at 4 and are carried on slides 5 supported in housings 6 suspended from the underside of a central table 7. The mechanism for advancing the stitchers is not shown, as it constitutes no part of the present invention, and it will be sufficient to state that motion is transmitted to stitcher slide through a shaft 8, which carries a gear 9.

The mechanism for revolving the turntable will not be described in detail, it being sufficient to state that it is rendered operative through a clutch 10 which is moved by a system of levers indicated at 11 (Fig. 3) which is in turn operated by a foot lever 12 located convenient to the operator at one of the positions, preferably the A position.

A part of the mechanism for operating the clutch mechanism just referred to is embodied in a slide 13 arranged to be reciprocated in a boxing 14 and carrying at its forward end a roller 18. The slide is normally held in its forward position by a spring 15 connecting a pin 16 on the slide and a pin 17 on the boxing. The outer end of the slide carries a roller 18 which is designed to enter a series of notches 19 in the inner edge of the turntable to properly position the turntable.

On the upper side of the boxing is supported a pair of tubes or guideways 20 in which are movable pins 21 which, when lowered, enter apertures or notches 22 in the upper face of the slide. When the pins are seated in the notches, the slide 13 cannot be withdrawn, which will lock the starting mechanism for the turntable.

Each of the pins is supported by a link 23 which is in turn suspended from the end of a lever 24 centrally pivoted in brackets 25 secured to the underside of the table. The opposite end of each lever extends into the path of a pin 26 secured on the face of one of the gears 9, and the arrangement is such that when the stitcher is in its withdrawn or retarded position, the pin 26 will raise the lever 24 and withdraw the pins 21. The two levers extend to the two stitchers, the arrangement of Fig. 2 being duplicated on the other side of the machine.

The operation of the device will be readily understood. It will be seen that only when both pins 21 are withdrawn, the slide 13 can be retracted and the turntable rotating mechanism moved into driving relation, and each pin can only be raised when its stitcher is withdrawn. The machine is thus rendered incapable of injuring the stitchers by means of a premature operation of the turntable revolving mechanism.

It is obvious that other ways might be devised to accomplish the purpose of this invention, and I am not restricted to the specific form shown, but am entitled to such equivalents as fall within the scope of the appended claims.

I claim:

1. A tire machine having a shiftable support for a plurality of tire cores, forming mechanism for shaping the fabric about the cores, and means to prevent the shifting of the support until the forming mechanism is withdrawn.

2. A tire machine having a movable table, a plurality of core supports on said table, forming mechanism for shaping the fabric about the cores, means for moving the table to shift the cores, the forming mechanism being moved over the surface of the cores and retracted, means for locking the table moving mechanism, said locking means being released when the forming mechanism is retracted.

3. A tire machine having a turntable, a core support on the said table, a plurality of forming mechanisms for shaping the fabric about the core, means for moving the turntable to present the core to the different forming mechanisms, a locking device for said moving means, said locking device being controlled by the position of the forming mechanism.

4. A tire machine having a turntable, a core support on said table, a fabric shaping mechanism, means for moving the fabric shaping mechanism over the core and withdrawing it therefrom, turntable shifting means, a locking device for said shifting means, said locking device being controlled by the position of the shaping mechanism.

5. A tire machine having a turntable, a core support on said table, a fabric shaping mechanism, means for moving the fabric shaping mechanism over the core and retracting it therefrom, turntable shifting means, a locking pin in said shifting means, and a device for withdrawing said pin operated upon retraction of the fabric shaping mechanism.

6. A tire machine having a turntable, a plurality of core supports on said table, a pair of fabric shaping mechanisms, means for moving the fabric shaping mechanism over the core and retracting it therefrom, turntable shifting means, a pair of locking pins on said shifting means, and devices for withdrawing said pins operated upon retraction of the fabric shaping mechanisms.

WILLIAM C. STEVENS.